United States Patent [19]

Karbowski

[11] 4,323,847
[45] Apr. 6, 1982

[54] OSCILLATOR TYPE METAL DETECTOR WITH SWITCH CONTROLLED FIXED BIASING

[75] Inventor: James P. Karbowski, Philomath, Oreg.

[73] Assignee: Triple Dee Electronics Inc., Lebanon, Oreg.

[21] Appl. No.: 47,225

[22] Filed: Jun. 11, 1979

[51] Int. Cl.³ .............................................. G01V 3/165
[52] U.S. Cl. ...................................... 324/327; 331/65
[58] Field of Search ...................... 324/327, 236, 237; 331/65, 109, 117, 136, 172

[56] References Cited

U.S. PATENT DOCUMENTS

| | | | |
|---|---|---|---|
| 3,453,532 | 7/1969 | Gardiner | 324/327 |
| 3,747,010 | 7/1973 | Buck | 324/327 X |
| 3,747,011 | 7/1973 | Buck | 324/327 X |
| 3,747,012 | 7/1973 | Buck | 324/327 X |
| 3,872,398 | 3/1975 | Fausone et al. | 331/117 X |
| 3,961,238 | 6/1976 | Randolph | 324/327 |
| 3,996,510 | 12/1976 | Guichard | 324/327 X |
| 4,021,756 | 5/1977 | Podowski et al. | 331/117 R |
| 4,024,468 | 5/1977 | Hirschi | |
| 4,030,026 | 6/1977 | Payne | |
| 4,110,679 | 8/1978 | Payne | |

*Primary Examiner*—Gerard R. Strecker
*Attorney, Agent, or Firm*—Stevens, Davis, Miller & Mosher

[57] ABSTRACT

An apparatus is described for detecting the presence of metal objects which may be subterranean. The apparatus comprises an amplifier equipped with a feedback network for forcing the amplifier into oscillation. The amplifier is critically biased such that the minimum gain necessary to maintain oscillation at the frequency of resonance is achieved. The presence of metal near the search coil which forms the tuned circuit of the amplifier loads the output circuit of the amplifier to a degree which suppresses oscillation. An indicator is provided to indicate when the oscillation has decreased in amplitude, whereby a metal object may be located.

7 Claims, 2 Drawing Figures

OSCILLATOR TYPE METAL DETECTOR WITH SWITCH CONTROLLED FIXED BIASING

BACKGROUND OF THE INVENTION

The subject of this invention relates to metal detectors for locating subterranean metal objects. Specifically, a new type of metal detector is described which has a low cost of manufacture and is usable with a minimum amount of operator instruction or know-how.

It is known in the art that subterranean metal objects may be located by transmitting and receiving an electromagnetic wave in the vicinity of the buried metal object. As the source of the electromagnetic wave comes closer to the metal object, a distortion in the field resulting from a change in magnetic permeability is produced which may be detected. The most common means for detecting changes in the field includes operating an electronic oscillator circuit having a resonant frequency in the vicinity of objects which are to be detected. When the oscillator is brought in the proximity of metal, a change in the frequency of the oscillator is detected because of changes in permeability. The change in frequency can be sensed by comparing it to an oscillator of a fixed frequency whereby the difference between the two oscillators may be made audible to an operator of the metal detector. With this class of metal detector, it is possible to even determine the nature of the material being detected in that the direction of frequency shifting of the oscillator will indicate the type of material being detected.

One of the difficulties with using this class of metal detector is that mineralized ground interferes with the detection of subterranean metal objects. The mineralized ground provides a signal which is capable of shifting the frequency of the oscillator due to changes in permeability it provides to the field produced by the oscillator in a manner similar to that produced by a metallic object.

Another class of metal detector uses a transmit and receive scheme where an underground object such as coins, rings, or metal cable is energized with an energized field producing eddy currents in the surface of the metal object which produces an alternating field. The alternating field is detected by operating a receiver above ground, having a search coil. The operator of the search coil senses the presence or absence of the electromagnetic field produced by the energized metal object and notes the location of the object based upon the strength of the signal received.

The present invention operates on a different principle which gives it substantial immunities from the effects of mineralized ground and is simpler in operation than the transmit and receive apparatus in that only a single unit is required to make the detection.

SUMMARY OF THE INVENTION

The object of the invention is to provide a low-cost metal detector having an improved immunity to mineralized ground effects for locating metal objects.

It is another object of this invention to provide a metal locator with a minimum number of operator controls.

This and other objects are provided by the invention which provides for the detection of metal objects which are subterranean. The apparatus of the invention provides a search coil which is part of the resonant circuit of a transistor amplifier which is provided with a feedback loop to force the amplifier into oscillation. The effect of changes to the Q of the resonant circuit due to the presence of a metal object is used to reduce the tendency of the amplifier to oscillate.

Changes in the search coil resonant circuit Q are advantageously detected by biasing the transistor amplifier to provide the minimum loop gain in the absence of metal to maintain oscillation. As the search coil is brought into proximity to a metal object, the Q of the coil decreases causing a reduction in the amplitude of the oscillations. Means are provided for indicating to an operator when changes in the amplitude of oscillations occur.

In one embodiment of the invention, the preferred bias level is established through a second feedback loop in the absence of a metal object. Prior to beginning a search for metal objects, the bias level is stored on a capacitor and holds the oscillator into the oscillating condition until the search coil is in proximity with the metal to be detected.

In a preferred embodiment of the invention, the metal detector is provided with means for providing an audible signal when oscillations have decreased in amplitude or ceased entirely, thus identifying the proximity of a metal object.

DESCRIPTION OF THE PREFERRED EMBODIMENT

Figure 1:
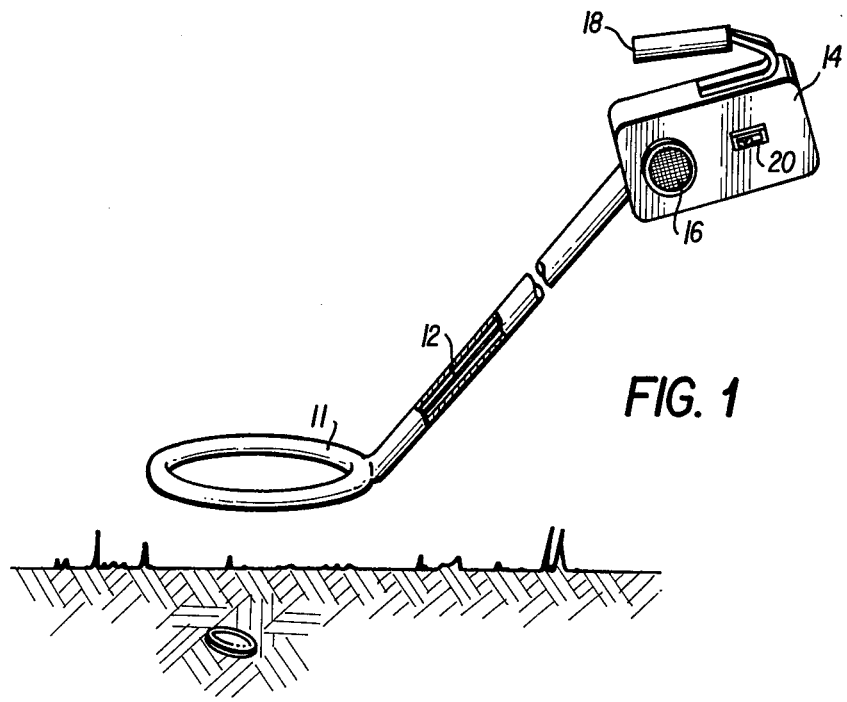
FIG. 1 illustrates the use of the metal detector of the preferred embodiment of this invention.

Referring now to FIG. 1, there is shown an embodiment of a metal object detector of the present invention. The metal object detector comprises a search coil 11 which is adapted to be located in the presence of a metal object. The search coil 11 comprises a bifilar winding which serves as the primary and secondary of a transformer. The ends of the bifilar winding are connected to a cable 12 which terminates at the control unit 14.

The control unit 14 is equipped with a speaker 16 for providing an audible indication when the proximity of metal is detected. A first switch 18 is used to initialize the circuitry contained in the control unit 14 before searching for metal. A second switch 20 is provided to energize the circuitry within the control unit 14 from a self-contained battery.

The control unit 14 includes a circuit which forms an oscillator in combination with coil 11. Before searching for metal objects, the operator activates switch 18 which biases the oscillator critically whereby the presence of metal objects will "load" the oscillator causing the oscillations to decrease in amplitude or cease. The ground in the absence of a metal object will provide very little loading of the oscillator even if it is highly mineralized. The mineralized condition will effect the frequency of operation but have a minimum impact on the magnitude of the oscillations. The circuit also provides means for activating a speaker 16 when oscillation amplitudes have decreased or ceased, indicating the presence of metal.

Figure 2:
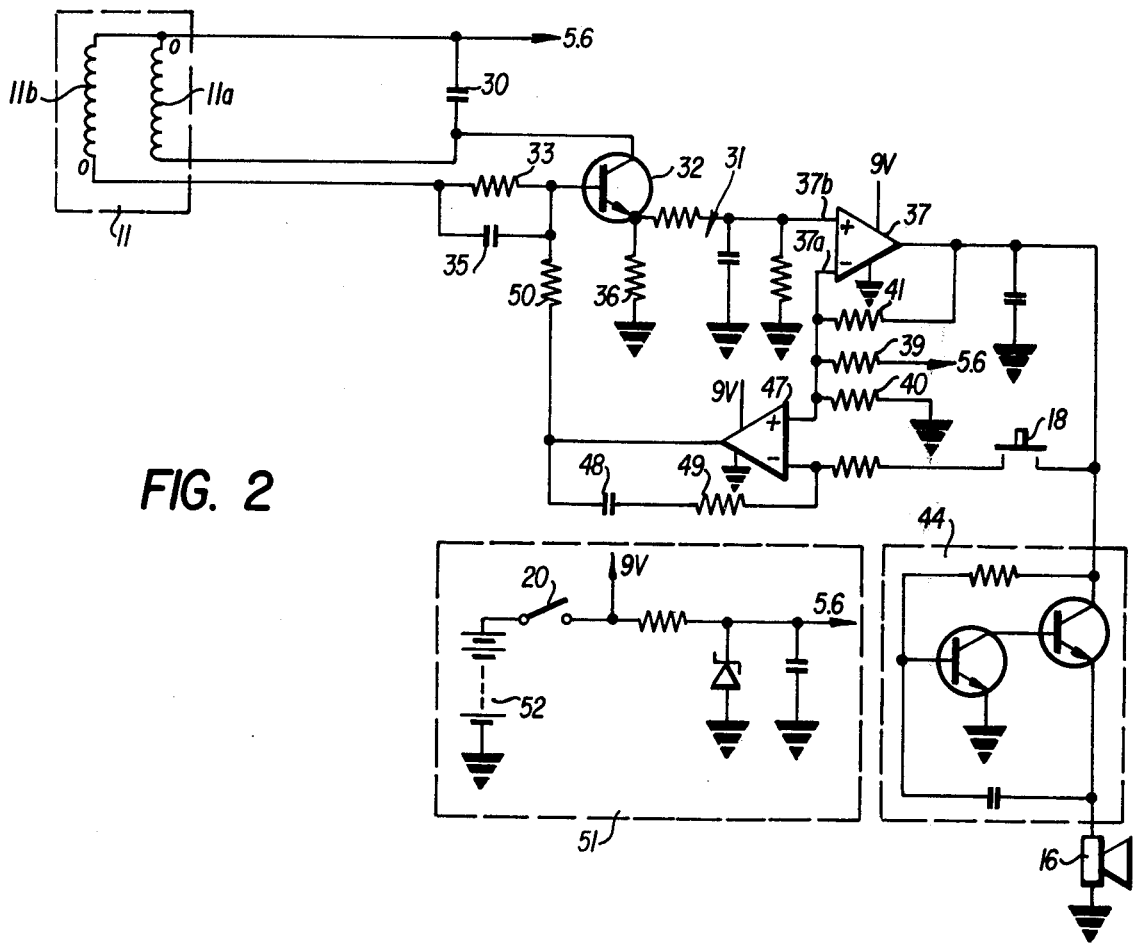
FIG. 2 illustrates the circuit details of the circuitry used in the preferred embodiment.

Referring now to FIG. 2, the circuitry used in a preferred embodiment of this invention will be described. The search coil 11 in combination with capacitor 30 provides a resonant circuit for establishing the frequency of oscillation of an oscillator. In a preferred embodiment of the invention, the frequency of resonance is selected to be 10 KHZ.

Two windings 11a, 11b which are bifilar are provided for a search coil 11, the first winding 11a being in parallel with capacitor 30 and the second winding 11b providing a feedback current having a phase for forcing transistor 32 into oscillation. The feedback current is provided by the parallel combination of resistor 33 and capacitor 35 to the base circuit of transistor 32.

The oscillating transistor 32 is maintained at a critical loop gain greater than 1 and typically between 1.1 and 1.3. The effect of maintaining this critical gain level is to provide an oscillator which decreases in oscillation amplitude upon a change in load current. Load current is influenced by the proximity of metal objects near the search coil 11. The magnetic field associated with the search coil 11 is coupled to the metal object to be detected and oscillation amplitude is reduced or ceases completely.

Oscillation ceases because the complex load impedance provided by the search coil 11 is proportional to $$X_L/R_s$$

where $X_L$ is the reactance of the search coil 11 and $R_s$ is the effective resistance of the search coil 11. The proximity of a metal object will lower the Q of the search coil by increasing the losses of the search coil 11, some of the magnetic energy of the search coil 11 being dissipated as $I^2R$ losses in the detected metal. The field produced by the coil induces eddy currents in the metal object. The eddy currents generate a counter field which opposes the field of the search coil. These effects produce a loading of the collector circuit of transistor 32.

A lowering in dynamic collector impedance will cause the current in transistor 32 to increase toward saturation, effectively lowering the current gain of the transistor 32. As oscillation was established prior to bringing the metal object into proximity with the search coil 11, at a minimum transistor gain, the oscillation amplitude will decrease since the lowering of the coil 11 Q effectively lowers the system gain of the oscillator.

The lowering of the system gain causes a corresponding rise in the voltage developed across the emitter resistor 36. This increase in emitter voltage can be detected to indicate the amplitude of oscillation has changed.

Detection of the rise in emitter voltage is sensed as a voltage rise at the output of differential amplifier 37. Low pass filter 31 supplies essentially a d.c. voltage to the non-inverting input of differential amplifier 37. Differential amplifier 37 has an inverting input 37a connected to bias resistors 39, 40 and to one side of feedback resistor 41. The output of differential amplifier 37 is also connected to multivibrator 44 which produces a 500 CPS audio signal. The multivibrator 44 shown is arranged to oscillate when the voltage from differential amplifier 37 exceeds 1 volt. As the output of differential amplifier 37 increases over the 1 volt threshold level, the intensity and frequency of oscillation produced by multivibrator 44 increases. A speaker 16 is connected to the multivibrator 44 to permit the changes in multivibrator 44 output signal to be heard.

The critical biasing of the transistor 32 to produce a critical loop gain for the oscillator is achieved by providing a second feedback loop which is used to initialize the bias current in transistor 32. The second feedback loop comprises essentially differential amplifier 37 connected to the inverting input of a second differential amplifier 47 through a switch 18. A holding capacitor 48 is provided with a series charging resistor from the inverting input of the second amplifier 47 to the output of the differential amplifier 37. A bias voltage of approximately 1 volt is applied to the non-inverting input of differential amplifier 47 and the inverting input of differential amplifier 37 through resistors 39, 40.

Resistors 33, 50 are selected so that when the voltage at the output of differential amplifier 47 is at 0 volts, transistor 32 is biased at substantially the maximum point of current gain. The voltage produced at the emitter of the transistor 32 is amplified by differential amplifier 37 at a gain of 350. Applying this output voltage to the inverting input of differential amplifier 47 forces the output voltage of amplifier 47 towards 0, the bias position for maximum current gain of transistor 32. Oscillations will thereafter commence which, however, lowers the effective d.c. voltage at the emitter of transistor 32. Since the voltage at the output of differential amplifier 47 is determined by the voltage at the emitter of transistor 32 through switch 18 and differential amplifier 37, the increasing oscillations will cause the output voltage of differential amplifier 47 to increase. The increasing voltage supplied by differential amplifier 47 alters the bias point of transistor 32 until a marginally stable oscillating state is achieved.

Opening switch 18 stores a voltage on capacitor 48 which is substantially the output voltage of differential amplifier 47 applied to achieve the marginally oscillatory condition on transistor 32. The stored voltage maintains the oscillator in the oscillating state at a minimum loop gain.

When a metallic object is brought in the proximity of the search coil 11, the field coupling between the search coil 11 and the metallic object increases the effective losses of the search coil, which increases the current in the collector emitter circuit of transistor 32. The resulting increase in current forces the transistor 32 to operate at a point towards a condition of saturation. This corresponds to a current gain for the transistor insufficient to maintain the same amplitude of oscillation. Therefore, the amplitude of oscillation will decrease or cease entirely and the voltage at the output of differential amplifier 47 will increase, resulting in an increase in the amplitude of the audible signal produced by speaker 16.

FIG. 2 also shows a power supply 51 for supplying from a battery 52 contained in control unit 14 a 9 volt level for operating the differential amplifiers 37, 47 and a 5.6 stabilized voltage level to operate the oscillator.

The aforegoing construction provides advantages over the prior art in that the circuit responds to the loading of the oscillator output rather than a change in frequency of the oscillator. The prior art devices, which depend on a change in oscillator frequency, were sensitive to mineralized ground terrain which can cause a change in effective inductance of the search coil. The resulting shift in inductance changes the frequency of oscillation but this is largely undetected by the operator. The present embodiment, which detects the decrease in amplitude of oscillation or the absence of oscillation rather than a change in frequency is, therefore, advantageous when used in terrain which is mineralized.

Thus, there is described with respect to one embodiment a device for detecting the presence of a buried metal object. Those skilled in the art will recognize other embodiments defined more particularly by the claims which follow.

What is claimed is:

1. A metal detecting device comprising:
   (a) a transistor amplifier including a tuned resonant circuit in the collector circuit of said transistor amplifier; said tuned resonant circuit being adapted to be located near a metal object;
   (b) a feedback circuit for providing a current from said resonant circuit to said transistor amplifier input for forcing said amplifier into an oscillating condition;
   (c) means for supplying a fixed biasing current to said transistor amplifier in response to a voltage occuring at said amplifier output upon momentary closure of a switch means connected to said amplifier output for maintaining the minimum gain necessary to cause said amplifier to oscillate at substantially the resonant frequency of said tuned resonant circuit in the absence of a metal object in proximity of said resonant circuit, said means providing a new fixed biasing current upon subsequent momentary actuation and release of said switch for reestablishing a minimum gain for producing oscillations in said amplifier compensating for a change in the effective Q of said resonant circuit due to the presence of said metal object; and
   (d) means for indicating when the amplitude of oscillations produced by said transistor amplifier decreases whereby the presence of said object is detected.

2. A metal detector according to claim 1, wherein said means for indicating a decrease in amplitude of said oscillations includes a means for producing an audible sound.

3. A metal detector for locating a metal object comprising:
   (a) a transistor amplifier having a collector circuit, emitter circuit, and base circuit;
   (b) a tuned resonant circuit in series with said collector circuit; at least a portion of said tuned resonant circuit being adapted to be located in the vicinity of the metal object;
   (c) feedback means for supplying current from said resonant circuit to the base of said transistor, said current having a phase which forces said transistor into oscillation;
   (d) means for biasing said transistor at a fixed level to maintain a minimum gain necessary for producing oscillations of said transistor in response to a momentary closure of a switch, said switch connected to provide a voltage from said amplifier to said means for biasing, said biasing level remaining until said switch is reclosed whereby a new fixed bias level is established and maintained on said transistor amplifier reestablishing the minimum gain for maintaining oscillations when said metal object is in the vicinity of said tuned circuit; and
   (e) means for indicating when the amplitude of the oscillations produced by said transistor has decreased whereby the presence of said object is detected.

4. The apparatus of claim 3, wherein said means for biasing said transistor comprises:
   (a) a differential amplifier having a first input connected to said emitter circuit and a second input connected to a reference voltage;
   (b) a second differential amplifier having a first input connected to said reference voltage and a second input, a switch having first end connected to the output of said first amplifier and a second end connected to the remaining input of said second differential amplifier; whereby the closure of said switch will provide a bias voltage for said transistor to provide the minimum gain necessary to maintain oscillation; and
   (c) means for retaining said bias voltage on said transistor when said switch is opened.

5. An apparatus for detecting the proximity of metal objects comprising:
   (a) an amplifier having a resonant tuned circuit in the output circuit of said amplifier, said circuit being adapted to be located in the vicinity of the object to be detected, whereby electromagnetic energy from said circuit is free to interact with said object;
   (b) means for introducing feedback to said amplifier input from said tuned circuit whereby an oscillatory condition is produced in said amplifier;
   (c) means for biasing said amplifier to achieve a gain sufficient to maintain oscillation of said amplifier in the absence of a metal object in proximity with said tuned circuit, said means for biasing including
       feedback means providing a path from the output of said amplifier to the input of said amplifier for applying a biasing voltage to said amplifier for establishing a forward gain for said amplifier sufficient to support an oscillatory condition;
       a switch for interrupting said path;
       means for storing and applying said biasing voltage to said amplifier input when said switch is interrupting said path;
       whereby closure of said switch establishes a new bias voltage for said amplifier for restoring the amplitude of oscillations produced in the presence of said metal object; and
   (d) means connected to said amplifier for indicating when said amplifier oscillations have decreased in amplitude in response to the presence of said metal object near said resonant tuned circuit.

6. An apparatus for detecting the presence of a buried metal object comprising:
   (a) a transistor oscillator having a resonant tuned circuit positionable near a buried object wherein said tuned circuit is magnetically coupled with said object altering the Q of said resonant circuit;
   (b) a feedback network connected to said oscillator, said feedback network providing a voltage proportional to the amplitude of oscillations produced by said oscillator;
   (c) means connected to said feedback network for biasing said oscillator to provide a sufficient forward gain for maintaining said oscillations, including a switch for momentarily applying a voltage from said feedback network to said means for biasing whereby said oscillator gain is momentarily set;
   (d) means for storing and maintaining a fixed bias voltage generated in response to said switch closure on said oscillator after said switch is opened; and
   (e) means connected to said feedback network for monitoring the magnitude of oscillations produced by said oscillator whereby the change in Q of said tuned circuit in response to the proximity of said metal object is detected as a change in amplitude of said oscillations, the amplitude of said oscillations being restored in response to a momentary closure of said switch whereby a new fixed bias voltage is established.

7. An apparatus for detecting the presence of a buried metal object comprising:
- (a) a transistor oscillator circuit comprising a transistor having a collector, emitter, and base, a tuned resonant circuit having a first end connected to said collector, and a second end, said circuit being positionable in proximity with a buried metal object;
- (b) a first feedback circuit magnetically coupled to said resonant circuit, said feedback circuit providing a signal to said base member for initiating oscillation of said transistor;
- (c) an emitter circuit having first and second ends, said first end being connected to said emitter;
- (d) means for applying a voltage between said tuned resonant circuit second end and said emitter circuit second end;
- (e) a second feedback circuit connected to receive a voltage from said emitter indicative of the magnitude of oscillations produced by said transistor, including a switch, to supply a momentary bias voltage to said base in response to the closure of said switch, said bias voltage having a magnitude sufficient to establish the minimum gain for maintaining said transistor in an oscillating state;
- (f) voltage storing means for storing and holding said bias voltage on said base in response to the opening of said switch whereby oscillation of said transistor is maintained at a fixed amplitude until said resonant circuit is brought into proximity with said metal object whereby the magnitude of said oscillations are decreased altering said emitter voltage; and
- (g) means for indicating changes in said emitter voltage whereby the proximity of said metal object is detected.

* * * * *